US010072691B2

(12) United States Patent
Schachner

(10) Patent No.: US 10,072,691 B2
(45) Date of Patent: Sep. 11, 2018

(54) ATTACHMENT MEANS FOR CONNECTING THIN-WALLED ROOF OR FACADE PANELS TO A SUBSTRUCTURE AS WELL AS A KIT HAVING SUCH AN ATTACHMENT MEANS AND A SEALING WASHER AND A KIT HAVING SUCH AN ATTACHMENT MEANS AND A SEALING WASHER AND A MAGAZINING-BELT, RESPECTIVELY

(71) Applicant: RAIMUND BECK NAGELTECHNIK GMBH, Mauerkirchen (AT)

(72) Inventor: Stefan Schachner, Maria-Schmolln (AT)

(73) Assignee: Raimund Beck Nageltechnik GmbH, Mauerkirchen (AT)

( * ) Notice: Subject to any disclaimer, the term of this patent is extended or adjusted under 35 U.S.C. 154(b) by 0 days.

(21) Appl. No.: 15/077,356

(22) Filed: Mar. 22, 2016

(65) Prior Publication Data
US 2017/0152880 A1 Jun. 1, 2017

(30) Foreign Application Priority Data
Dec. 1, 2015 (DE) .......................... 20 2015 106542

(51) Int. Cl.
*F16B 15/06* (2006.01)
*E04F 13/08* (2006.01)
(Continued)

(52) U.S. Cl.
CPC ............... *F16B 15/06* (2013.01); *E04D 3/30* (2013.01); *E04F 13/0871* (2013.01);
(Continued)

(58) Field of Classification Search
CPC .... F16B 15/06; F16B 25/0031; F16B 43/001; F16B 15/08; F16B 15/02; E04F 13/0871; E04F 13/12; E04D 3/30
(Continued)

(56) References Cited

U.S. PATENT DOCUMENTS 71,166 A 11/1867 Harvey
264,479 A * 9/1882 Rogers .................... F16B 25/00
403/343

(Continued)

FOREIGN PATENT DOCUMENTS

DE 7029451 U 11/1970
DE 3107403 DE 2/1982
(Continued)

*Primary Examiner* — Adriana Figueroa
(74) *Attorney, Agent, or Firm* — Berenato & White, LLC

(57) ABSTRACT

An attachment means for connecting thin-walled roof or facade panels to a substructure has a shaft on one end region with a point and on the other end region with a head. A number of longitudinal grooves are provided on the shaft which extend parallel or substantially parallel to the central longitudinal axis X of the shaft. The head of the attachment means has a flat-head at a side of which facing the shaft a washer is formed, which radially protrudes outwards from the flat-head. A fine thread is formed on the shaft at least in some regions. Further the invention relates to a kit having such an attachment means and a sealing washer and a kit having such an attachment means and a sealing washer and a magazining-belt, respectively, and a method for connecting a thin-walled roof or facade panel to a substructure.

20 Claims, 3 Drawing Sheets

(51) Int. Cl.
*E04D 3/30* (2006.01)
*E04F 13/12* (2006.01)
*F16B 43/00* (2006.01)
*F16B 15/08* (2006.01)
*F16B 15/02* (2006.01)
*F16B 25/00* (2006.01)

(52) U.S. Cl.
CPC .............. *E04F 13/12* (2013.01); *F16B 15/02* (2013.01); *F16B 15/08* (2013.01); *F16B 25/0031* (2013.01); *F16B 43/001* (2013.01)

(58) Field of Classification Search
USPC ......................................................... 52/410
See application file for complete search history.

(56) References Cited

U.S. PATENT DOCUMENTS

| | | | |
|---|---|---|---|
| 408,751 A | 8/1889 | Rose | |
| 418,844 A * | 1/1890 | Kay | F16B 15/06 411/394 |
| 2,005,672 A | 7/1933 | Chaffee | |
| 2,609,604 A | 9/1952 | Sprague | |
| 3,566,738 A * | 3/1971 | Cupit | E04D 3/3606 411/369 |
| 3,748,949 A | 7/1973 | Dreger | |
| 3,803,972 A * | 4/1974 | Deutsher | F16B 33/004 411/337 |
| 3,865,006 A | 2/1975 | Massoney | |
| 3,885,669 A * | 5/1975 | Potucek | F16B 27/00 206/338 |
| 3,915,367 A * | 10/1975 | Potucek | F16B 15/08 221/74 |
| 4,383,608 A * | 5/1983 | Potucek | F16B 15/08 206/347 |
| 4,460,300 A * | 7/1984 | Bettini | F16B 33/004 411/375 |
| 4,577,445 A * | 3/1986 | Price | E04F 13/12 52/396.04 |
| 4,606,455 A * | 8/1986 | Grikis | F16B 27/00 206/347 |
| 4,653,486 A * | 3/1987 | Coker | A61B 17/68 606/65 |
| 4,834,600 A * | 5/1989 | Lemke | E04D 3/3603 411/182 |
| 4,875,818 A * | 10/1989 | Reinwall | F16B 33/004 411/369 |
| 4,900,208 A * | 2/1990 | Kaiser | E04D 3/3603 411/188 |
| 4,906,148 A * | 3/1990 | Schule | E04D 3/3603 411/34 |
| 5,096,061 A * | 3/1992 | Wakai | F16B 15/08 206/347 |
| 5,156,509 A * | 10/1992 | Wu | E04D 3/365 411/369 |
| 5,907,938 A * | 6/1999 | Sheahan | E04D 3/3603 411/531 |
| 6,021,617 A * | 2/2000 | Sheahan | E04D 13/006 411/381 |
| 6,024,268 A * | 2/2000 | Horng-Lin | B25C 1/003 227/109 |
| 6,098,801 A * | 8/2000 | McCardle | B23K 9/206 206/338 |
| 6,269,604 B1 * | 8/2001 | Pedersen | E04D 3/30 52/537 |
| 6,413,326 B1 | 7/2002 | Rallis | |
| 6,764,262 B1 * | 7/2004 | Hargis | F16B 35/06 411/369 |
| 7,063,491 B2 | 6/2006 | French | |
| 7,713,292 B2 * | 5/2010 | Biedermann | A61B 17/8625 606/279 |
| 8,807,601 B2 * | 8/2014 | Anderson | F16L 5/06 285/139.2 |
| 2006/0002784 A1 * | 1/2006 | Curtis | F16B 33/004 411/371.1 |
| 2006/0239797 A1 * | 10/2006 | Evanbar | F16B 5/0241 411/542 |
| 2010/0068004 A1 * | 3/2010 | Mair | F16B 43/001 411/542 |
| 2012/0096701 A1 * | 4/2012 | Schachner | F16B 15/06 29/432 |
| 2015/0071731 A1 * | 3/2015 | Scheerer | F16B 25/0021 411/353 |
| 2015/0176627 A1 * | 6/2015 | Schneider | F16B 33/06 29/525.02 |
| 2015/0290754 A1 | 10/2015 | Schachner | |

FOREIGN PATENT DOCUMENTS

| | | | | |
|---|---|---|---|---|
| EP | 1850016 A1 | 10/2007 | | |
| FR | 2515713 A1 * | 5/1983 | ........... | E04D 3/3606 |
| WO | 9905421 A1 | 2/1999 | | |
| WO | 2010139345 A1 | 12/2010 | | |

* cited by examiner

ATTACHMENT MEANS FOR CONNECTING THIN-WALLED ROOF OR FACADE PANELS TO A SUBSTRUCTURE AS WELL AS A KIT HAVING SUCH AN ATTACHMENT MEANS AND A SEALING WASHER AND A KIT HAVING SUCH AN ATTACHMENT MEANS AND A SEALING WASHER AND A MAGAZINING-BELT, RESPECTIVELY

CROSS-REFERENCE TO RELATED APPLICATIONS AND CLAIM TO PRIORITY

This application is related to application number 20 2015 106 542.6, filed Dec. 1, 2015, in the Federal Republic of Germany, the complete disclosure of which is incorporated herein and to which priority is claimed.

FIELD OF THE INVENTION

The present invention relates to an attachment means for connecting thin-walled roof or facade panels to a substructure, the attachment means having a shaft on one end region of which a point and on the other end region of which a head are formed.

BACKGROUND OF THE INVENTION

On construction sites various plane components have to be connected with each other. For this purpose in the prior art the widest variety of attachment means are known. Roof or facade panels have to be connected to an underlying substructure, for example. By way of example such panels can be mostly thin-walled, hard roof or facade metal cladding sheets, PVC panels, Plexiglas panels or polyester panels, which often have a trapezoidal profile shape or a wave profile shape. The underlying substructure can in particular be a wooden substructure. But substructures made of construction materials having a similar softness or a metallic substructure made of thin sheet metal are conceivable as well. For the assembly of, for example, roof metal sheets on a wooden substructure merely classical screws are known from the prior art. However, when screwing in a classical screw into a roof metal sheet and subsequently into the underlying wooden substructure, chips are formed. In particular metal chips are very edgy and can damage a seal positioned between the screw head and a surface of the roof metal sheet. Thus there is the risk that fluids such as water enter into the connection. Even if no seal is foreseen, most small chips can accumulate between the screw head and the surface of the roof metal sheet and thus prevent the screw head from contacting the roof metal sheet to form a sealed connection.

SUMMARY OF THE INVENTION

It is therefore the object of the present invention to provide an attachment means of the aforementioned type with which thin-walled hard roof or facade panels can be connected with an underlying substructure without sealing problems.

This object is achieved according to the invention in that a number of longitudinal grooves are provided on the shaft which extend parallel or substantially parallel to the central longitudinal axis of the shaft, that the head of the attachment means is a flat-head, that at the side of the flat-head facing the shaft a washer is formed, which radially protrudes outwards from the flat-head and that a fine thread is formed on the shaft at least in some regions.

The longitudinal grooves formed on the shaft according to the invention among others minimize the rotational movement when driving in the attachment means enforced by the thread, which is formed on the shaft at least in some regions. Due to the reduced rotational movement driving of the attachment means is simplified and a formation of chips is prevented or at least minimized as well. In the following the application of a fixation of a hard and thin trapezoidal metal sheet on an underlying wooden substructure is exemplary considered. Further, the longitudinal grooves ensure that, when driving the attachment means through the trapezoidal metal sheet into the wooden substructure, according to the formation and number of longitudinal grooves small material projections are formed at the not visible bottom side of the trapezoidal metal sheet, which stabilize the thread of the shaft when it is unscrewed from the components connected therewith. Because the thread is able to cut thread turns into the material projections when the attachment means is turned. Furthermore, the flat-head of the attachment means according to the invention is advantageous, since contrary to a countersunk head the flat-head is not countersunk in the trapezoidal metal sheet, when the attachment means is driven. Instead, the flat-head lies flat on the visible surface of the trapezoidal metal sheet with its formed washer, whereby a risk of injury is minimized. Moreover, no dirt or water can accumulate between the surface of the trapezoidal metal sheet and the head of the attachment means according to the invention. Due to the specific design of the head section of the attachment means according to the invention, a hole in the trapezoidal metal sheet formed by the shaft when driving the attachment means into the trapezoidal metal sheet is not further widened by the flat-head, as it would happen in the case of using a countersunk head. Instead a large contact face of the head on the visible surface of the trapezoidal metal sheet is ensured by the washer, which is formed at the flat-head and protrudes from the flat-head, such that enough force can be transferred from the head of the attachment means onto the surface of the trapezoidal metal sheet in order to press the trapezoidal metal sheet sufficiently strong to the wooden substructure and thus to ensure an optimal seal. Since a thread is formed on the shaft of the attachment means, the attachment means compared to a classical nail can be removed from the materials connected therewith.

Preferably the attachment means according to the invention is suitable for connecting roof or facade panels in the form of roof or facade metal cladding sheets, PVC panels, Plexiglas panels or polyester panels in trapezoidal profile shape or wave profile shape to a substructure, in particular a wooden substructure. Thereby, the previously mentioned roof or facade panels have in particular a thickness of 0.2 to 1.6 mm. Particularly preferred the thickness of the roof or facade panels is 0.8 mm.

Expediently the attachment means according to the invention is a nail screw, which can be driven into the components to be connected by means of an automatic nail gun without or substantially without any rotational movement. Due to an almost rotation-free driving similar to a classical nail a formation of chips is prevented or at least minimized, which would otherwise result in damages of the sealing washer. Moreover, the driving of a nail screw compared to the screwing of a classical screw takes significantly less time, resulting in saving of time and costs during assembly of the components. Expedient is also that the position of the nail screw driven into the components can be adjusted by means of a screwdriver and/or that the nail screw can be unscrewed from the components by means of the screwdriver. Considering that on construction sites and also on finished buildings already mounted components have to be removed repeatedly for the purposes of repair, maintenance or renovation work, the possibility to unscrew the attachment means without material destruction is essential.

In order to ensure an uniform unscrewing of the attachment means from the connection area for example by means of a respective cordless screwdriver, it can be expedient to arrange the longitudinal grooves, in particular three longitudinal grooves, evenly distributed over the peripheral surface of the shaft. Of course an asymmetrical arrangement of the grooves is conceivable as well. A number of three longitudinal grooves is particularly advantageous, since hereby a minor rotational movement, which cannot be avoided when driving the attachment means, can be further reduced as for example compared to only two longitudinal grooves.

According to an embodiment of the invention the longitudinal grooves are arranged such that they extend from the point along the fine thread section of the shaft up to or to just before the washer. These moreover parallel aligned longitudinal grooves thus allow an even easier driving of the attachment means into the components to be connected.

Due to the fact that the longitudinal grooves can reduce the extraction values of the attachment means, the longitudinal grooves should have the smallest possible width, ideally so that the material projections or bars forming in the components to be connected, in particular in thin-walled metallic components, do not buckle when inserting the nail screw.

For this reason it can also be advantageous to form the longitudinal grooves, not over the whole length of the shaft, but only in the region which coincides with the region of the components, in which material projections have to be formed.

Thereby, the longitudinal grooves can have a semicircular, V-shaped or U-shaped cross-sectional profile. Other embodiments of the cross-sectional shapes of the longitudinal grooves are also conceivable. Moreover the longitudinal grooves preferably have a depth which corresponds to the depth of the fine thread formed on the shaft.

Preferably the outer diameter of the fine thread is between 3 and 5 mm, in particular 4.2 mm. A thread diameter dimensioned in such a way is on the one hand small enough to allow an easy driving due to a manageable drive resistance and is on the other hand large enough to enable a sufficient stability of the connection of the components.

In order to enable particularly smooth-running and simple unscrewing of the attachment means from the components to be connected, in one exemplary embodiment the fine thread is provided with self-cutting thread flanks. Preferably the fine thread is double threaded. Hereby compared to a simple fine thread with one turn a larger axial movement is achieved and thus the attachment means can be faster unscrewed from the connected components.

According to a further embodiment of the invention the flat-head of the attachment means has an outer profile, in particular an external hexagon, for engagement with a screwdriver, which is complementary thereto. Such an outer profile is in particular advantageous when the attachment means is used to fix roof panels, since in contrast to a respective inner profile water cannot accumulate in a cavity of the head of the attachment means. If the flat-head is exemplary formed in the form of an external hexagon, a stop surface of a screwdriver, which is formed complementary thereto, can come to rest on the side of the washer facing the flat-head. Hereby a complete driving of the attachment means can be ensured.

Advantageously the washer is annular, in particular circular ring-shaped, since such washers are commercial practice as well as easy to manufacture and/or to form. Because the washer protrudes radially outwards from the flat-head an annular shape is in particular advantageous when the attachment means is to be magazined. In such a case for example a hexagon shape would be more unsuitable since, in order to ensure an even distance between several of such attachment means on a magazining-belt, one would have to consider their orientation relative to each other when inserting the attachment means into the magazining-belt. However in general also other shapes are conceivable for the formed washer, such as for example an arbitrary polygon shape of the outer periphery of the washer.

Expediently an annular sealing washer, in particular a circular ring-shaped sealing washer, made of ethylene-propylene-diene-rubber, EPDM, is pushed on the shaft and arranged thereon such that it contacts a lateral surface of the washer facing the shaft. The flat-head having the formed washer of the attachment means according to the invention by itself already ensures a sealing, which is for example improved compared to a countersunk head. By means of a sealing washer, which in the above mentioned example is clamped tightly between the visible surface of the trapezoidal metal sheet and the washer when the attachment means is driven through the trapezoidal metal sheet into the underlying wooden substructure, water can even better be prevented from entering in the area of the wooden substructure through the hole formed in the trapezoidal metal sheet by the shaft of the attachment means. A sealing washer made of EPDM is particularly advantageous, since this material is extremely weather-resistant and water-repellent. However, also other sealing washers having similar properties can be used. Expediently the sealing washer has a thickness of 2 to 3 mm, preferably 2.7 mm, and a rigidity of 80+/−5 Shore, preferably 80 Shore. Due to the specific formation of the shaft of the attachment means according to the invention having the axially parallel longitudinal grooves the sealing washer can be unhesitatingly employed. Because the longitudinal grooves enable a driving of the attachment means without or substantially without any rotational movement and thus without or without considerable formation of chips, which could damage the sealing washer and make it leaky.

Preferably the inner diameter of the sealing washer corresponds to the outer diameter of the fine thread. Here the inner diameter of the sealing washer is in particular less or equal to the outer diameter of the fine thread. The inner diameter of the sealing washer should not be too large such that an optimal sealing can be ensured and the sealing washer is not arranged loosely on the shaft. Hence it is in particular advantageous when the inner diameter is slightly smaller than the thread diameter. Because then the sealing washer is clamped tightly on the shaft by utilizing an elastic restoring force of the sealing washer. The sealing washer thus holds on the thread alone by the choice of the diameter tolerances. This provides the advantage that the sealing washer cannot simply disengage oneself from the attachment means and get lost during transport of the attachment means. Moreover the sealing washer remains at the position designated for it so that a disadvantageous turning or an imbalance of the sealing washer is avoided when the attachment means is driven. Furthermore it is advantageous when the sealing washer and the washer are annular and the outer diameter of the sealing washer, in particular in an uncompressed state, substantially corresponds to the outer diameter of the washer. One the one hand it is desirable for reasons of appearance when the outer diameter of a circular ring-shaped sealing washer corresponds to the diameter of a washer, which is circular ring-shaped as well, since in this way the sealing washer is hardly visible. The sealing washer may also have any other form. For example in the case of a polygon-shaped washer it can have the same polygon shape as well.

According to a further embodiment of the invention the attachment means is heat-treated, in particular austempered, whereby its strength and rigidity is increased.

The aforementioned object of the invention is also achieved according to the invention by a kit having an attachment means according to the invention and an annular sealing washer, in particular a circular ring-shaped sealing washer, made of ethylene-propylene-diene-rubber, EPDM, associated with the attachment means. However, the sealing washer may also consist of any arbitrary other material having in particular properties similar to those of EPDM. Expediently the sealing washer has a thickness of 2 to 3 mm, preferably 2.7 mm, and a rigidity of 80+/−5 Shore, preferably 80 Shore. The inner diameter of the sealing washer corresponds to the outer diameter of the fine thread of the shaft of the attachment means, whereby it is in particular less or equal to the outer diameter of the fine thread. Expediently the sealing washer and the washer are annular and the outer diameter of the sealing washer, in particular in an uncompressed state, substantially corresponds to the outer diameter of the washer. Preferably the sealing washer is pushed on the shaft and arranged thereon such that it contacts a lateral surface of the washer facing the shaft.

Advantageously the kit further comprises a magazining-belt, in particular in the form of a smooth elastic plastic strip, dimensioned for a plurality of attachment means of similar type, in which the attachment means can be magazined. Basically magazining is always advantageous, since in this way the attachment means can be used with an automatic magazine-based drive gun. This enables an immense saving of time and costs during assembly of the components. Particularly advantageous is magazining of the attachment means in a smooth elastic plastic strip. Because the attachment means, for example as nail screw, is relative large compared to classical nails, which due to their size can be coil-like wound up. Wounding up a plurality of the attachment means according to the invention is however not feasible. Instead these can be magazined in a smooth elastic plastic strip, which is continuously moved forward to the drive mechanism of a nail gun during the drive process. Preferably the magazining-belt comprises an elongated base section, which defines a longitudinal axis of the magazining-belt, and a plurality of tab-like lateral sections, which are formed at the both longitudinal sides of the base section and which each have a passage opening being in particular open in the direction of a distal end of the respective lateral section facing away from the base section, wherein always two lateral sections formed at the opposing longitudinal sides lie pairwisely opposite each other and can be turned down from a plane common with the base section to a position substantially perpendicular to the base section, in which position both passage openings of the lateral sections are aligned coaxially to each other such that the shaft can be pushed into both passage openings and is then positioned in the magazining-belt perpendicular to the longitudinal axis of the magazining-belt and parallel to the base section. Expediently the lateral sections are integrally formed with the base section. Due to the specific design of the magazining-belt an attachment means can easily be moved of its magazined position in the magazining-belt during the drive process. Moreover preferably a plurality of recesses is formed centrally in the base section of the magazining-belt. These recesses can have any arbitrary form and in particular provide the advantage that material can be saved.

With regard to further embodiments and advantages of the attachment means and the sealing washer it is referred to the above statements related to the attachment means according to the invention in order to avoid repetitions.

Furthermore the aforementioned object of the invention is achieved according to the invention by a method for connecting a thin-walled roof or facade panel to an underlying substructure. Here a nail screw, in particular a nail screw as previously described, is driven through the thin-walled roof or facade panel into the substructure by means of an automatic nail gun without or substantially without any rotational movement. Here the connection between the roof or facade panel and the substructure is sealed by compressing the annular sealing washer between the washer and a surface of the roof or facade panel. The method preferably comprises the further steps of adjusting a position of the driven nail screw by means of a screwdriver and/or unscrewing the nail screw from the substructure and the roof or facade panel by means of the screwdriver. Expediently the roof or facade panel is a roof or facade metal cladding sheet, a PVC panel, a Plexiglas panel or a polyester panel in trapezoidal profile shape or wave profile shape and the substructure is in particular a wooden substructure. In particular the roof or facade panel has a thickness of 0.2 to 1.6 mm. The thickness of the roof or facade panel is preferably 0.8 mm.

Thus, with the attachment means describes above for the first time an attachment means is provided with which thin-walled hard roof or facade panels can be connected with an underlying substructure without sealing problems.

BRIEF DESCRIPTION OF THE DRAWINGS

Further features and advantages of the present invention will be become apparent by means of the following description of an embodiment of the attachment means according to the invention with reference to the accompanying drawings. Therein is.

DETAILED DESCRIPTION OF THE PREFERRED EMBODIMENT(S)

Figure 1:
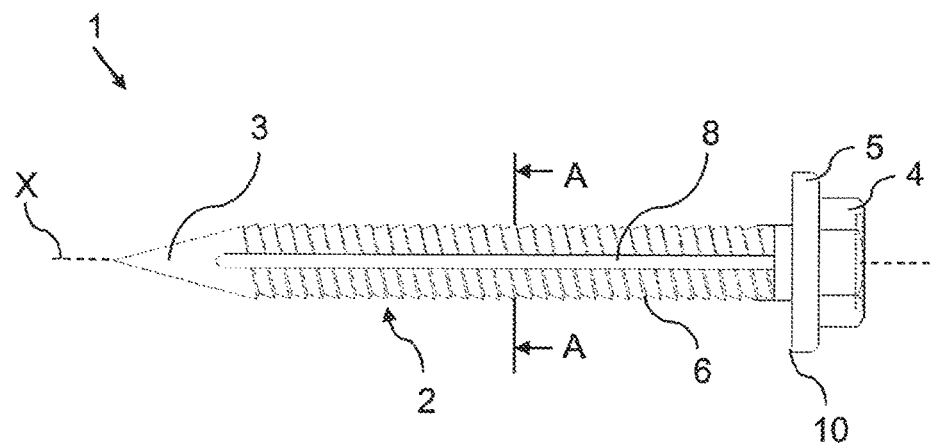
FIG. 1 a schematic view of an attachment means according to the invention in the form of a nail screw without sealing washer.
Figure 2:
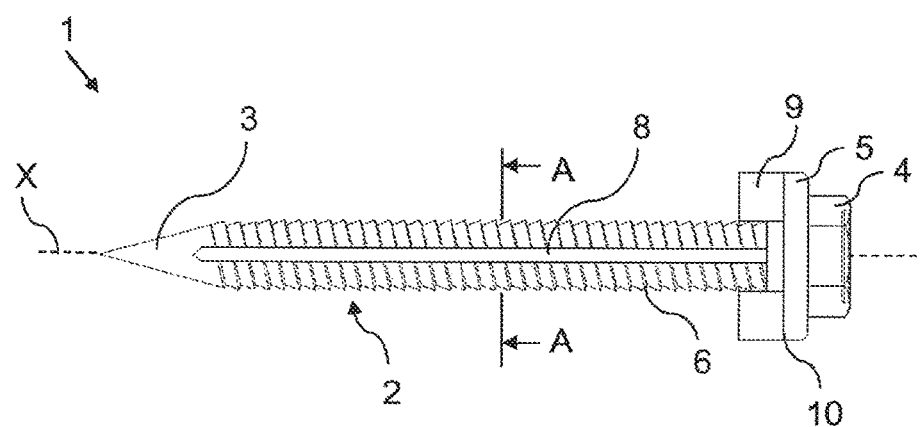
FIG. 2 a schematic view of an attachment means according to the invention in the form of a nail screw with sealing washer.
Figure 3:
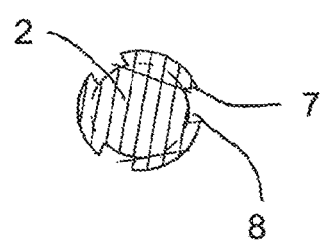
FIG. 3 a cross-section along section line A-A according to FIG. 1 or 2.

The FIGS. 1 to 3 show schematic views of an attachment means 1 according to the invention in the form of a nail screw 1.

The nail screw 1 has a shaft 2 on one end region of which a point 3 and on the other end region of which a flat-head 4 are formed, wherein the flat-head 4 has an external hexagon shape. Such an external hexagon profile can easily be brought into engagement with a screwdriver, which is complementary thereto. Certainly it is also possible to provide the flat-head 4 with an arbitrary other outer profile or an inner profile such as for example a cross recess or a simple recess. At the side of the flat-head 4 facing the shaft 2 a washer 5 is formed, which radially protrudes outwards from the flat-head 4. A fine thread 6 is formed on the shaft 2. As best shown in FIGS. 1 and 2, the fine thread 6 starts above the point 3, so that the point 3 is non-threaded. The fine thread 6 may be an arbitrary single or multi thread, preferably a double thread. In the present case the fine thread 6 has self-cutting thread flanks 7. Three longitudinal grooves 8 are provided on the shaft 2 which extend parallel to the central longitudinal axis X of the shaft 2 and are arranged evenly distributed over the peripheral surface of the shaft 2. More precisely in the present embodiment the longitudinal grooves 8 extend from the end section of the shaft 2 in which the point 3 is formed along the entire fine thread section to just before the washer 5. In another embodiment which is not shown here the longitudinal grooves 8 may also extend only over a partial section of the shaft 2 provided with the fine thread 6. As in particular can be seen in the cross-sectional view of FIG. 3, the longitudinal grooves 8 have a substantially U-shaped cross-sectional profile and a depth which corresponds to the depth of the fine thread 6 formed on the shaft 2. But, in an embodiment not shown here, the longitudinal grooves 8 may also have a semicircular or V-shaped cross-sectional profile.

In the attachment means 1 shown in FIG. 2, a circular ring-shaped ethylene-propylene-diene-rubber, EPDM, sealing washer 9 is pushed on the shaft 2 of the attachment means 1 such that it contacts a lateral surface 10 of the washer 5 facing the shaft 2. In this embodiment the inner diameter of the sealing washer 9 substantially corresponds to the outer diameter of the fine thread 6. But, in other embodiments, the inner diameter of the sealing washer 9 may for example also be less than the outer diameter of the fine thread 6 in order to clamp the sealing washer 9 by utilizing an elastic restoring force of the sealing washer 9 tightly on the shaft 2. As can be seen in FIG. 2 as well, the outer diameter of the circular ring-shaped sealing washer 9 substantially corresponds to the diameter of the circular ring-shaped washer 5.

Figure 4:
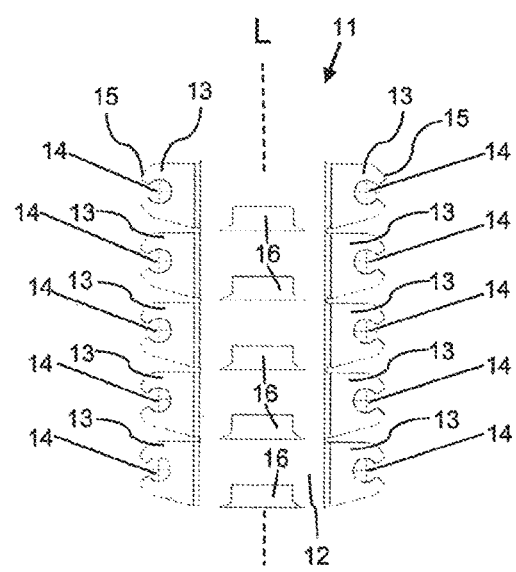
FIG. 4 a schematic partial view of an exemplary magazining-belt to magazine the attachment means according to the invention.
Figure 5:
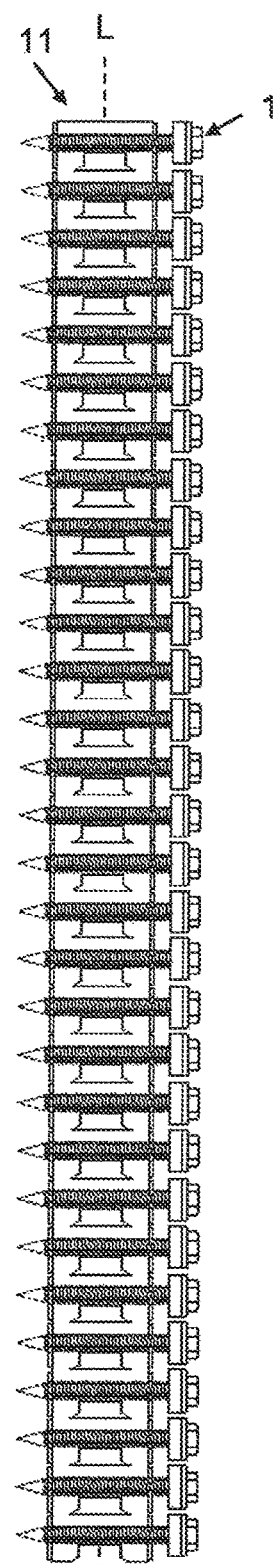
FIG. 5 a schematic total view of the magazining-belt, which is only partially shown in FIG. 4, having a plurality of attachment means according to FIG. 2 magazined therein.

The embodiment of the nail screw 1 according to the invention shown in FIGS. 1 to 3 can be magazined in a magazining-belt 11. Such a magazining-belt 11 in the form of a smooth elastic plastic strip is exemplary shown in FIGS. 4 and 5. However, arbitrary other magazining-belts 11 are also conceivable as long as they are suitable to magazine a nail screw 1 according to the invention. From FIG. 2 it can be seen that the magazining-belt 11 comprises an elongated base section 12, which defines a longitudinal axis L of the magazining-belt 11, and a plurality of tab-like lateral sections 13, which are formed at the both longitudinal sides of the base section 12. The lateral sections 13 each have a passage opening 14 being in particular open in the direction of a distal end 15 of the respective lateral section 13 facing away from the base section 12. Preferably the lateral sections 13 are formed integrally with the base section 12. Always two lateral sections 13 formed at the opposing longitudinal sides lie pairwisely opposite each other and can be turned down from a plane common with the base section 12 to a position substantially perpendicular to the base section 12. The last-mentioned position of the lateral sections 13 with respect to the base section 12 is shown in FIG. 5. It can be seen that both passage openings 14 of the lateral sections 13 are aligned coaxially to each other and that the shaft 2 is pushed into both passage openings 14 and positioned in the magazining-belt 11 perpendicular to the longitudinal axis L of the magazining-belt 11 and parallel to the base section 12. In this way in the example of FIG. 5 overall thirty nail screws 1 according to the invention are magazined in the magazining-belt 11.

The magazined nail screws 1 shown in FIG. 5 are nail screws 1 according to FIG. 2, hence nail screws 1 having an annular sealing washer 9, although the longitudinal grooves 8 cannot be seen in FIG. 5 due to the small illustration of the single nail screws 1. Furthermore in the magazining-belt 11 of FIGS. 4 and 5 a plurality of recesses 16 is formed centrally in the base section 12 of the magazining-belt 11. In the present example the number of recesses 16 is exactly half the number of lateral sections 13 and the recesses 16 have a substantially rectangular shape having pointed extensions at two edges of the rectangle. The recesses 16 for example serve to save material costs.

Figure 6:
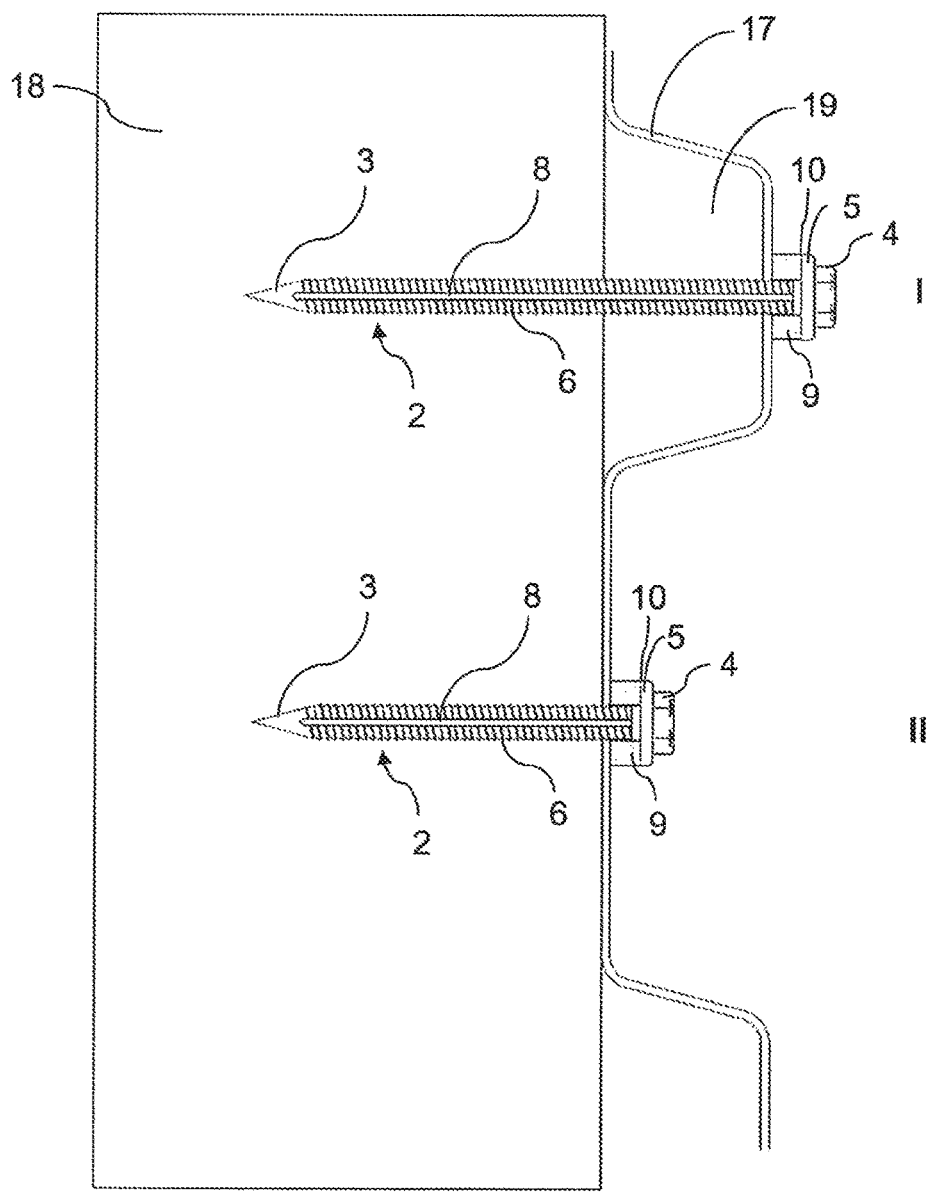
FIG. 6 a schematic view of a connection of a trapezoidal metal sheet with an underlying wooden substructure by means of two attachment means according to the invention according to FIG. 2, which have different lengths.

FIG. 6 shows a schematic view of a connection of a thin-walled hard trapezoidal metal sheet 17 with an underlying wooden substructure 18 by means of two nail screws 1 having an annular sealing washer 9 according to the invention according to FIG. 2, which have different lengths. For achieving the connection shown in FIG. 6 each nail screw 1 was driven through the trapezoidal metal sheet 17 into the underlying wooden substructure 18 by means of an automatic nail gun substantially without any rotational movement. Here one of both nail screws 1 was driven into the trapezoidal metal sheet 17 at a position I at a high point of the trapezoidal metal sheet 17. That is why it first extends through a cavity 19 between the trapezoidal metal sheet 17 and the wooden substructure 18 and only then into the wooden substructure 18. By contrast, the other nail screw 1 was driven into the trapezoidal metal sheet 17 at a position II at a low point of the trapezoidal metal sheet 17. This is why it directly extends into the wooden substructure 18 after penetrating the trapezoidal metal sheet 17. In order to ensure a connection that is similarly strong at position I as at position II, the nail screw 1 at position I has a shaft 2, which is correspondingly longer as compared to the shaft 2 of the nail screw 1 at position II. As can be seen from FIG. 6 as well, the circular ring-shaped sealing washer 9 is only slightly compressed and the outer diameter of the sealing washer 9 corresponds substantially to the diameter of the annular washer 5. Furthermore the sealing washer 9 is undamaged due to missing formation of chips.

If the position of the nail screw 1 driven into the components 17, 18 is to be adjusted or if the nail screw 1 is to be removed from the connected components 17, 18, it is turned by means of a screw driver and thereby cuts a threaded portion in the components 17, 18 through its self-cutting thread flanks 7. Hereby an easy unscrewing of the nail screw 1 from the components 17, 18 is facilitated. As already previously described, it also contributes to such an easy unscrewing that the longitudinal grooves 8 are arranged axially parallel and evenly distributed over the peripheral surface of the shaft 2.

Further, the attachment means 1 is heat-treated, in this embodiment austempered, to have a sufficient strength.

REFERENCE NUMERAL LIST 1 attachment means
2 shaft 3 point
4 flat-head
5 washer
6 fine thread
7 self-cutting thread flank
8 longitudinal groove
9 sealing washer
10 lateral surface of the washer
11 magazining-belt
12 elongated base section
13 tab-like lateral section
14 passage opening
15 distal end
16 recess
17 trapezoidal sheet
18 wooden substructure
19 cavity

The invention claimed is:

1. Attachment means for connecting thin-walled roof or facade panels to a substructure, the attachment means being drivable into the thin-walled roof or facade panels and the substructure to be connected by means of an automatic nail gun without or substantially without any rotational movement, and the attachment means being removable from the thin-walled roof or facade panels and the substructure by unscrewing without material destruction, the attachment means comprising:
 a shaft having a non-threaded point at one end region and a flat-head at the other end region, the flat-head having an external hexagonal outer profile;
 longitudinal grooves provided on the shaft extending parallel or substantially parallel to a central longitudinal axis of the shaft;
 a circular ring-shaped washer integrally formed at a side of the flat-head facing the shaft, the circular ring-shaped washer radially protruding outwards from the flat-head;
 a fine thread on the shaft at least in some regions, said longitudinal grooves extending along an entire length of the fine thread and beyond the fine thread into the non-threaded point; and
 a circular ring-shaped sealing washer pushed on the shaft and arranged thereon such that the circular ring-shaped sealing washer contacts a lateral surface of the circular ring-shaped washer facing the shaft, the circular ring-shaped sealing washer having an inner diameter that is equal to an outer diameter of the fine thread and an outer diameter that in an uncompressed state of the sealing washer substantially corresponds to an outer diameter of the circular ring-shaped washer, wherein the circular ring-shaped sealing washer is made of ethylene-propylene-diene-rubber and has a rigidity of 80±5 Shore.

2. Attachment means according to claim 1, wherein the attachment means is suitable for connecting the thin-walled roof or facade panels in the form of roof or facade metal cladding sheets, PVC panels, Plexiglas panels or polyester panels in trapezoidal profile shape or wave profile shape to the substructure.

3. Attachment means according to claim 1, wherein the attachment means is configured so that the position of the attachment means can be adjusted by means of a screwdriver and/or that the nail screw can be unscrewed from the components by means of the screwdriver.

4. Attachment means according to claim 1, wherein the longitudinal grooves comprise three longitudinal grooves arranged evenly distributed over a peripheral surface of the shaft.

5. Attachment means according to claim 1, wherein the longitudinal grooves extend up to or to just before the circular ring-shaped washer.

6. Attachment means according to claim 1, wherein the longitudinal grooves have a semicircular, V-shaped or U-shaped cross-sectional profile.

7. Attachment means according to claim 1, wherein the longitudinal grooves have a depth which corresponds to the depth of the fine thread formed on the shaft.

8. Attachment means according to claim 1, wherein the outer diameter of the fine thread is between 3 and 5 mm.

9. Attachment means according to claim 1, wherein the fine thread has self-cutting thread flanks.

10. Attachment means according to claim 1, wherein the fine thread is double threaded.

11. Attachment means according to claim 1, wherein the external hexagonal outer profile of the flat-head of the attachment means is configured for engagement with a screwdriver, which is complementary thereto.

12. Attachment means according to claim 1, wherein the outer diameter of the fine thread is 4.2 mm.

13. A kit, comprising:
 an attachment means for connecting thin-walled roof or facade panels to a substructure, the attachment means comprising a nail screw being drivable into the thin-walled roof or facade panels and the substructure to be connected by means of an automatic nail gun without or substantially without any rotational movement, and the attachment means being removable from the thin-walled roof or facade panels and the substructure by unscrewing without material destruction, the attachment means comprising
 a shaft having a non-threaded point at one end region and a flat-head at the other end region, the flat-head having an external hexagonal outer profile;
 longitudinal grooves provided on the shaft extending parallel or substantially parallel to a central longitudinal axis of the shaft;
 a circular ring-shaped washer integrally formed at a side of the head facing the shaft, the circular ring-shaped washer radially protruding outwards from the flat-head;
 a fine thread on the shaft at least in some regions, said longitudinal grooves extending along an entire length of the fine thread and beyond the fine thread into the non-threaded point; and
 a circular ring-shaped sealing washer is made of ethylene-propylene-diene-rubber, is associated with the attachment means, has a rigidity of 80±5 Shore, has an inner diameter that is equal to an outer diameter of the fine thread of the shaft of the attachment means and has an outer diameter that in an uncompressed state substantially corresponds to an outer diameter of the circular ring-shaped washer.

14. A kit according to claim 13, wherein the circular ring-shaped sealing washer is pushed on the shaft and arranged thereon such that the circular ring-shaped sealing washer contacts a lateral surface of the circular ring-shaped washer facing the shaft.

15. A kit according to claim 13, wherein the kit further comprises a magazining-belt in the form of a smooth elastic plastic strip, dimensioned for a plurality of attachment means of similar type, in which the attachment means can be magazined.

16. A kit according to claim 15, wherein the magazining-belt comprises an elongated base section, which defines a longitudinal axis L of the magazining-belt, and a plurality of tab-like lateral sections, which are formed at the both longitudinal sides of the base section and which each have a passage opening being in particular open in the direction of a distal end of the respective lateral section facing away from the base section, wherein always two lateral sections formed at the opposing longitudinal sides lie pairwisely opposite each other and can be turned down from a plane common with the base section to a position substantially perpendicular to the base section, in which position both passage openings of the lateral sections are aligned coaxially to each other such that the shaft can be pushed into both passage openings and is then positioned in the magazining-belt perpendicular to the longitudinal axis L of the magazining-belt and parallel to the base section.

17. A kit according to claim 16, wherein recesses are formed centrally in the base section of the magazining-belt.

18. A method for connecting a thin-walled roof or facade panel to an underlying substructure, comprising:

driving the attachment means of claim 1 through the thin-walled roof or facade panel into the substructure by means of an automatic nail gun without or substantially without any rotational movement, wherein the connection between the roof or facade panel and the substructure is sealed by compressing the circular ring-shaped sealing washer between the circular ring-shaped washer and a surface of the roof or facade panel.

19. A method according to claim 18, wherein the method further comprises:

adjusting a position of the driven attachment means by means of a screwdriver; and/or unscrewing the attachment means from the substructure and the roof or facade panel by means of the screwdriver.

20. A method according to claim 18, wherein the roof or facade panel is a roof or facade metal cladding sheet, a PVC panel, a Plexiglas panel or a polyester panel in trapezoidal profile shape or wave profile shape, and wherein the substructure is a wooden substructure.

* * * * *